Patented July 14, 1942

2,289,462

UNITED STATES PATENT OFFICE 2,289,462

PRODUCTION OF VANADYL SULPHATE

Holger H. Schaumann, Roselle, Del., assignor to E. I. du Pont de Nemours & Company, Wilmington, Del., a corporation of Delaware No Drawing. Application August 24, 1939, Serial No. 291,673

5 Claims. (Cl. 204—93)

This invention relates to the production of vanadyl sulphate from compounds of pentavalent vanadium. More particularly it relates to the production of vanadyl sulphate by the electrolytic reduction of a suspension of vanadium pentoxide.

The reduction of pentavalent vanadium compounds by various means has been practiced in the prior art. Thus, $V_2O_5$ has been dissolved in concentrated hydrochloric acid and the vanadium reduced to the tetravalent state. Further, sulphuric acid solutions of vanadic acid have been reduced through various stages down to the bivalent state by the action of various reducing agents.

Vanadium pentoxide is one of the more common commercial sources of vanadium. It is readily amenable to the preparation of concentrated vanadyl chloride solutions but it does not readily dissolve in sulphuric acid. Consequently, when the sulphuric acid solutions of vanadic acid are reduced it has been necessary to concentrate the resulting solutions by evaporation before obtaining crystalline vanadyl sulphate. There is a demand in the industry for soluble vanadyl salts and for economy in shipping and handling the dry salts or concentrated solutions.

This invention has as an object the production of vanadyl sulphate. A further object is the production of concentrated solutions of vanadyl sulphate from which the crystalline salt may be separated. Additional objects will become apparent from an examination of the following description and claims.

These objects are attained according to the herein described invention which broadly comprises passing an electric current through a sulphuric acid suspension of a pentavalent vanadium compound thereby reducing the vanadium to the tetravalent state.

In a more restricted embodiment, this invention comprises electrolizing a sulphuric acid suspension of vanadium pentoxide. It is desirable that the amount of sulphuric acid present in the suspension be equivalent to the vanadium according to the reaction:

$$2V_2O_5 + 4H_2SO_4 \rightarrow 4VOSO_4 + 4H_2O + O_2$$

The preferred embodiment of this invention comprises suspending vanadium pentoxide in water containing between about 10% and about 25% of sulphuric acid by weight. This suspension is then electrolyzed until a clear solution of vanadyl sulphate is produced. I prefer the current density to be between about 5 and about 25 amps./ sq. ft. at the cathode and between about 15 and about 150 amps./sq. ft. at the anode.

I have found it desirable to agitate the suspension in the cathode compartment and any suitable means of doing so may be employed. Agitation in the cathode compartment is desired for several reasons. First, the solid $V_2O_5$ must be kept from settling. Secondly, the agitation helps to prevent the undue concentration of the reduced vanadium at the cathode surface and it also serves to bring the sulphate $V_2O_5$ in the vicinity of the cathode surface where it is reduced.

Any type of electrolytic cell may be employed to effect the reduction. The electrodes may be made of any conducting substance not easily attacked by the solution. Platinum or gold and the like may be used but for practical operation I have found that lead or lead-antimony alloys may be satisfactorily employed for either electrode.

In order to realize a high current efficiency the use of a porous diaphragh between the anode and cathode compartments is desirable. This diaphragm may be made of any porous material not easily attacked by the solutions such as porous or unglazed porcelain, silica, alundum, carbon, carborundum, glass cloth, paper, asebestos, wool, etc. In order to maintain a low resistance in the cell, the anode compartment should be small and should be filled with a good electrolytic solution, preferably sulphuric acid of about the same concentration as that used in suspending the $V_2O_5$.

The electrolysis is normally run at whatever temperature results from the operating conditions. This temperature is above that of the surroundings due to the heat generated by virtue of the resistance offered to the passage of the current by the cell. However, the temperature may be controlled by other means familiar to those versed in the art in order to vary such factors as the speed of reduction, the maximum current density, the quality and concentration of the product, and the like.

This invention may be more readily understood by an examination of the following examples which are given for illustrative purposes and are not intended to place any restrictions or limitations on the herein described invention.

Example I 2880 grams Tech $V_2O_5$ (containing 1400 grams vanadium) was suspended in 14 liters 25% $H_2SO_4$ by weight in a 5 gallon stoneware cell. The mechanically agitated suspension was electrolyzed between a sheet lead cathode, 300 square inches in area, and a cylindrical lead anode, 77.5 square inches in area. The anode was immersed in a porous porcelain cylinder of 1650 cc. volume containing 25% $H_2SO_4$. The average distance between electrodes was 4 inches. After passing 732 ampere-hours of electricity through the suspension over a period of 18½ hours, a clear blue solution of vanadyl sulphate containing 98.4 grams V per liter was obtained at 98.8% current efficiency. Voltage at the electrodes was maintained in the range 4.6 to 6.0 volts with current supplied by a 7.5 volt-100 ampere motor generator set.

*Example II*

Two cells (A and B) were connected in series with the motor generator set used in Example I. Cell A consisted of the same apparatus used in Example I and contained 2310 grams Tech $V_2O_5$, equivalent to 1120 grams vanadium, suspended in 14 liters of 25% $H_2SO_4$ in the cathode compartment. In cell B, a perforated cylindrical lead anode, 60 square inches in area, was encased in a glass cloth bag. This anode was suspended at an average distance of 4.3 inches from a cathode similar to that in cell A. Cell B contained 2310 grams Tech $V_2O_5$ suspended in 16 liters 25% $H_2SO_4$ in the cathode compartment. After passing 600 ampere-hours of electricity through both cells over a period of 17½ hours all the $V_2O_5$ in cell A was reduced to vanadyl sulphate while cell B still showed traces of $V_2O_5$ in suspension, which required an additional 15 ampere-hours for complete conversion to vanadyl sulphate.

Current efficiencies calculated from analyses of the solutions for tetravalent vanadium gave 99.2% for cell A and 96.8% for cell B.

It is to be understood that the specific embodiments of this invention may be subjected to variation and modification without departing from the scope thereof. Thus, although I prefer to use a solution containing between about 10% and about 25% of sulphuric acid by weight, my invention is not limited thereto. For example, the amount of sulphuric acid used in the cathode compartment may vary upward from the equivalent of the vanadium pentoxide employed. Further, the vanadium pentoxide suspension in the cathode compartment may be varied in concentration from 1% $V_2O_5$ to enough to produce a saturated $VOSO_4$ solution as a final product.

The voltage that may be applied to my electrolytic operation depends upon the resistance and temperature of the particular cell being used. The voltage applied to any given pair of electrodes must, however, be sufficient to reduce the pentavalent vanadium and it should not be greater than that at which hydrogen begins to be liberated at the cathode. I have found it desirable to employ relatively low voltages, i. e., near the lower limit for a given cell, in order to realize high energy efficiency. Although I prefer a current density ranging between about 5 and about 25 amps./sq. ft. at the cathode and between about 15 and about 150 amps./sq. ft. at the anode, it is to be understood that a current density outside of these preferred ranges may be advantageously employed. Thus, I have found that very satisfactory results are obtained by having a current density of between about 1 and about 100 amperes/sq. ft. at the cathode and between about 1 and about 200 amps./sq. ft. at the anode.

My invention is not limited by the shape or size of the cells used. The cells may be arranged for the continuous passage of the vanadium containing liquors either through each cell or through a number of them in series. They may also operate by the batch method.

The cells may be connected singly to a source of current or they may be connected in groups either in series or parallel. The current used may be regular direct current from any usual source such as batteries, storage batteries, D. C. generators and the like, or it may be a rectified alternating current such as that supplied by synchronized converters, mercury vapor or vacuum tube rectifiers and others.

The shape and arrangement of the electrodes may be chosen from any suitable combination. For a one-cell batch operation a circular cell is satisfactory. A very convenient arrangement is to make the vessel itself of lead or a lead alloy and use it as a cathode. In this case the anode will be rod-shaped or cylindrical and suspended in the center of the vessel as nearly equidistant from the cathode surface as possible. In this cylindrical type of cell it is desirable that the anode area be between about $1/3$ and about $1/100$ of the area of the cathode. If desired, the electrodes may be perforated or slotted to change their effective area.

When rectangular cells are used the electrodes may be flat and arranged alternately in the bath, the anodic compartments being separated from the cathodic compartments by suitable diaphragms. The ratio of electrode areas in this case may also vary. When both anode and cathode are solid flat plates the area ratio is one. However, the anode may be perforated or slotted or fabricated from strips or rods etc. so as to reduce the anode/cathode area ratio.

For some industrial operations a solution of vanadyl sulphate in water or in dilute sulphuric acid is satisfactory and consequently it is not always necessary to crystallize the product from the solution. The concentration of the solution produced by the application of my invention may be controlled both with regard to vanadium content and sulphuric acid content within ranges which make the product most satisfactory for its subsequent use. If a clear solution is desired, it is only necessary to maintain a slight excess of sulphuric acid over that required for converting the $V_2O_5$ to $VOSO_4$.

While the diaphragm in the cell is not absolutely necessary to the reduction of the vanadium it will give much higher current efficiency. Without the diaphragm only 30 to 40% efficiency is realized as compared with 99% in some of my experiments. The diaphragm serves to keep the reduced vanadium out of the anode compartment where it tends to become reoxidized thereby requiring further current to reduce it again. The separation of the two compartments for similar reasons makes the complete reduction of the pentavalent to tetravalent vanadium possible.

The control of the electrolyte temperature is of value when preparing solutions of pure $VOSO_4$ with a minimum of free sulphuric acid. $VOSO_4$ is decomposed by hot water so as the final stage of the reduction is reached and the excess acid becomes exhausted the $VOSO_4$ will hydrolyze if kept too hot. On the other hand, when an excess of acid is permitted an increase in temperature will permit a higher current density at the same current efficiency, thereby increasing the speed of the operation.

The theory of the operation of this electrolytic reduction is well known by those acquainted with the art. The invention here lies in the novel use of electrolytic reduction which makes possible the production of strong vanadyl sulphate solutions without the expensive step of evaporation. I have found that $V_2O_5$ does not dissolve to any appreciable extent in sulphuric acid of my disclosed concentration. If the solution resulting from the leaching of $V_2O_5$ with such acid for a period of a week is reduced by prior art methods, a very dilute solution of $VOSO_4$ results. However, by electrolyzing a suspension of $V_2O_5$ I am able to obtain substantially saturated $VOSO_4$ solutions which carry upwards of 160 grams $V_2O_5$ per liter.

This invention is useful in preparing concentrated solutions of vanadyl sulphate free from contamination with metal or other ions which result from chemical reducing processes.

The advantages of making a concentrated solution according to my invention are many. Thus, in transportation, dilution always increases the cost per unit of pure substance. Crystalline vanadyl sulphate is therefore the most suitable form for transportation. My process is aptly suited for producing these crystals at low cost because most of the expense of concentration by evaporation is eliminated.

Further, the purity of my product is advantageous. No foreign substances remain in the $VOSO_4$ solution, whereas reduction with iron, etc. will leave a considerable concentration of these metals making a further purification step necessary. The contamination from non-metallic reducing agents may not be serious but I find these methods very slow and cumbersome compared with my simple electrolytic method.

Still further, the vanadyl sulphate is actually more satisfactory in treating pigments, for instance, than is the chloride. The chloride solution on evaporating in driers releases hydrochloric acid fumes which are very corrosive and soon destroy ordinary equipment. The sulphuric fumes arising from the heating of $VOSO_4$ do not present such a corrosion problem.

As many apparently widely different embodiments of this invention may be made without departing from the spirit and scope thereof, it is to be understood that I do not limit myself to the specific embodiment except as defined in the appended claims.

Having described the present invention the following is claimed as new and useful:

1. In a process for producing a substantially saturated solution of vanadyl sulphate the step which comprises passing an electric current through a dilute sulphuric acid suspension of vanadium pentoxide in a cathodic zone of an electrolytic cell, thereby reducing the vanadium to the tetravalent state, and utilizing an amount of vanadium pentoxide in the process sufficient to provide a substantially saturated vanadyl sulphate solution on reduction.

2. In a process for producing a substantially saturated solution of vanadyl sulphate the step which comprises suspending vanadium pentoxide in water containing between about 10% and about 25% of sulphuric acid by weight in a cathodic zone of an electrolytic cell and thereafter electrolyzing the suspension until a clear substantially saturated solution of vanadyl sulphate through reduction of said vanadium pentoxide to the tetravalent state is produced, the amount of vanadium pentoxide utilized in the process being sufficient to provide on reduction said saturated vanadyl sulphate solution.

3. In a process for producing a saturated solution of vanadyl sulphate the step which comprises suspending in a cathodic zone of an electrolytic cell vanadium pentoxide in water containing between about 10% and about 25% of sulphuric acid by weight, electrolyzing the suspension until a clear solution of vanadyl sulphate is produced through reduction of the vanadium to the tetravalent state, the current density during electrolysis being between about 1 and about 100 amperes per square foot at the cathode and between about 1 and about 200 amperes per square foot at the anode, and utilizing in the process an amount of vanadium pentoxide sufficient to provide on reduction a saturated vanadyl sulphate solution containing at least 160 g. $V_2O_5$ per liter.

4. In a process for producing a substantially saturated solution of vanadyl sulphate the step which comprises suspending in a cathodic zone of an electrolytic cell vanadium pentoxide in water containing between about 5% and about 25% of sulphuric acid by weight, electrolyzing the suspension until a clear solution of vanadyl sulphate is produced through reduction of the vanadium to the tetravalent state, the current density during electrolysis being between about 1 and about 100 amperes per square foot at the cathode and between about 15 and about 150 amperes per square foot at the anode, and utilizing in the process an amount of vanadium pentoxide sufficient to provide on reduction a substantially saturated vanadyl sulphate solution.

5. In a process for producing a substantially saturated solution of vanadyl sulphate the steps which comprise adding vanadium pentoxide to a solution containing water and between about 10% and about 25% of sulphuric acid by weight, the amount of vanadium pentoxide added being in excess of the solubility of this compound in the sulphuric acid, and thereafter electrolyzing the suspension with accompanying agitation in a cathodic zone of an electrolytic cell until a clear blue solution of vanadyl sulphate is produced through reduction of the vanadium pentoxide to the tetravalent state, the current density during electrolysis being between about 5 and about 25 amperes per square foot at cathode and between about 15 and about 150 amperes per square foot at the anode, and utilizing an amount of vanadium pentoxide in the process sufficient to provide on reduction a saturated vanadyl sulphate solution containing upwards of 160 g. $V_2O_5$ per liter.

HOLGER H. SCHAUMANN.